United States Patent [19]

Smith

[11] Patent Number: 5,417,008
[45] Date of Patent: May 23, 1995

[54] DOWNRIGGER LINE RELEASE DEVICE

[76] Inventor: Donald D. Smith, 257 10th St., Burlington, Colo. 80807

[21] Appl. No.: 312,515

[22] Filed: Sep. 26, 1994

Related U.S. Application Data

[62] Division of Ser. No. 147,389, Nov. 3, 1993.

[51] Int. Cl.[6] ............................ A01K 91/03; A01K 91/08
[52] U.S. Cl. ....................................... 43/43.12; 43/44.95
[58] Field of Search ................... 43/43.13, 43.12, 44, 43/92, 44.94, 44.95

[56] References Cited

U.S. PATENT DOCUMENTS

| | | | |
|---|---|---|---|
| 3,879,884 | 4/1975 | Tucker, Sr. | 43/43.12 |
| 4,261,130 | 4/1981 | Cudnohufsky | 43/43.12 |
| 4,426,804 | 1/1984 | Hutson | 43/44.95 |
| 5,150,540 | 9/1992 | Bennett | 43/43.12 |

Primary Examiner—P. Austin Bradley
Assistant Examiner—Jeanne M. Elpel
Attorney, Agent, or Firm—John R. Flanagan

[57] ABSTRACT

A downrigger line release device includes a clamp mounted to a fishing line, a coupler mounted to a downrigger line, and a swivel connector pivotally interconnecting the clamp and coupler to one another. The coupler includes a flexible retainer element convertable from a rolled-up condition in which it slidably receives the downrigger line to an unrolled condition in which it releases therefrom in response to a predetermined force being applied to the retainer element so as to permit uncoupling of the fishing line from the downrigger line.

10 Claims, 3 Drawing Sheets

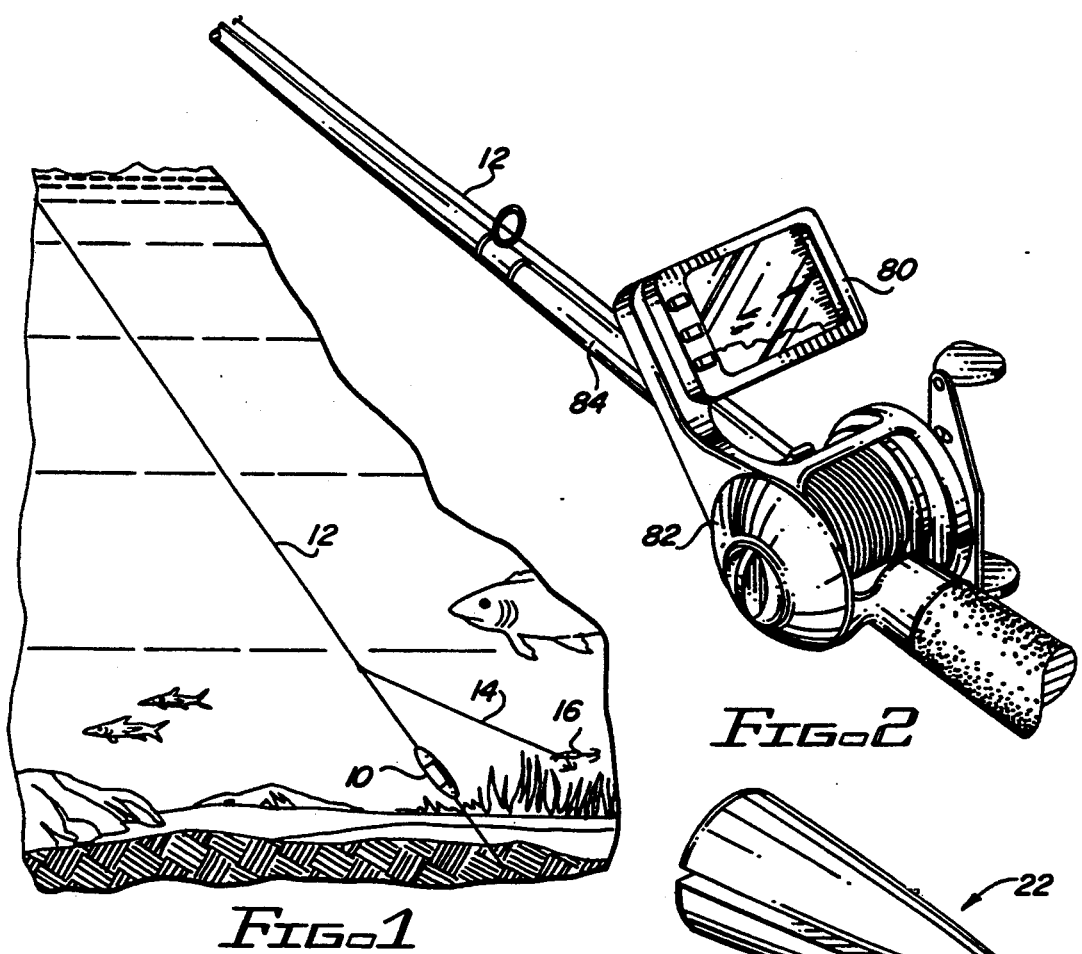
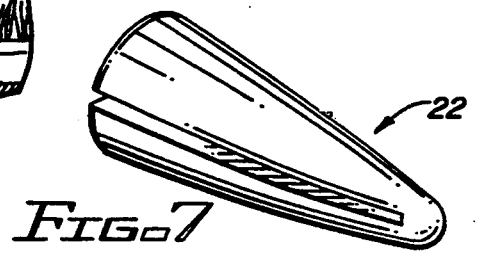
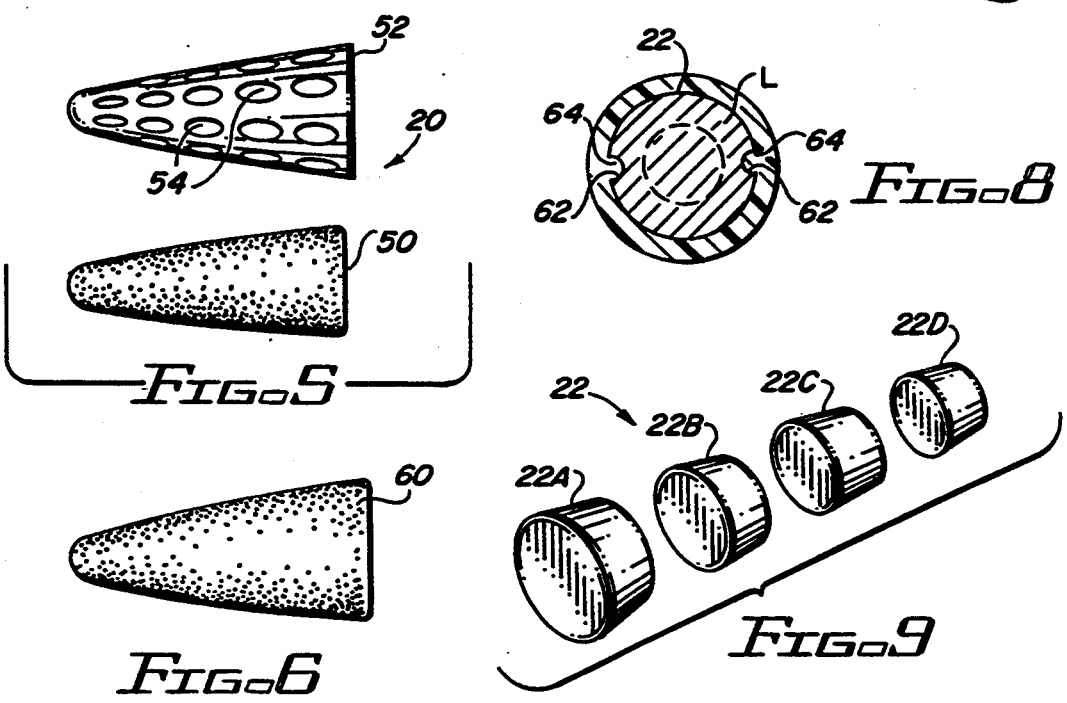

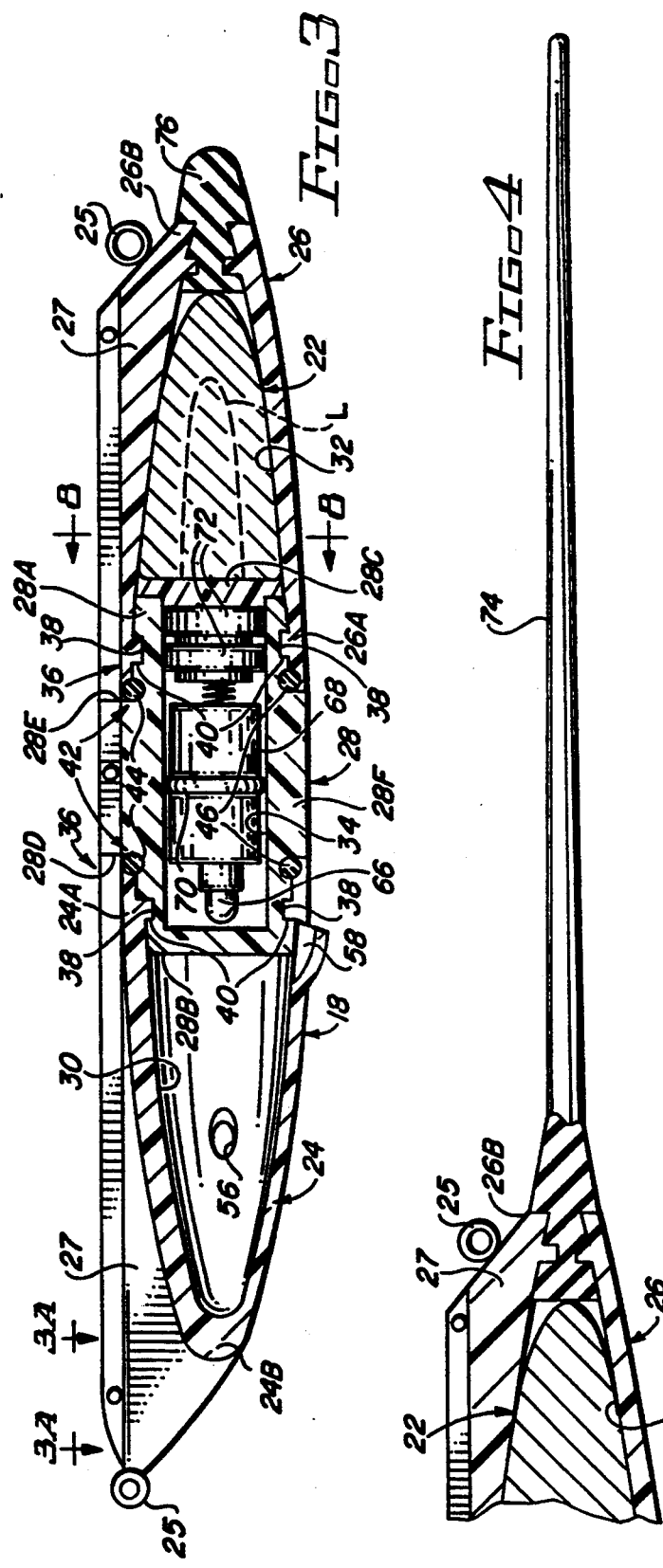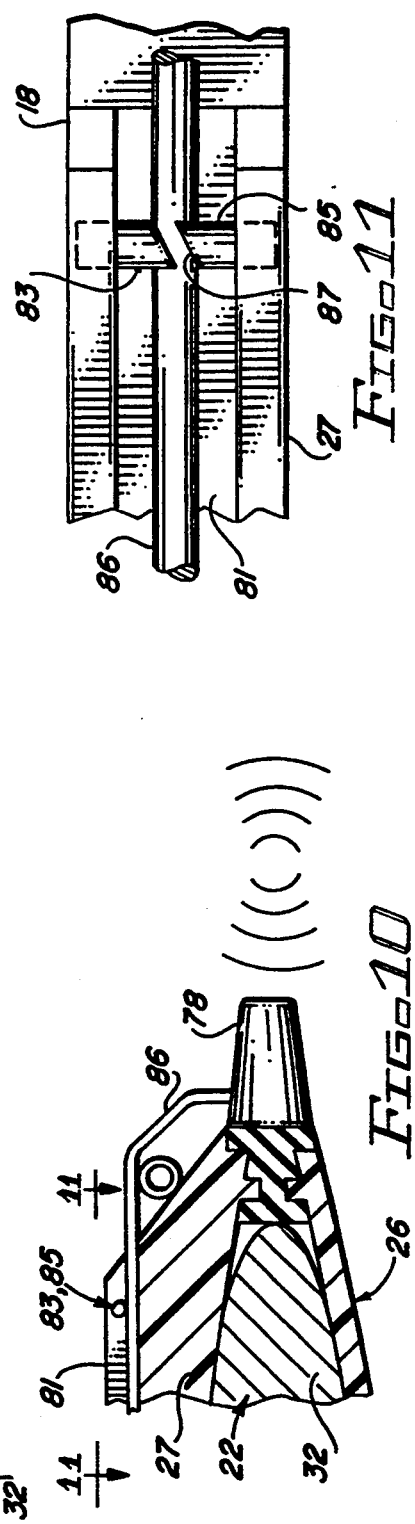

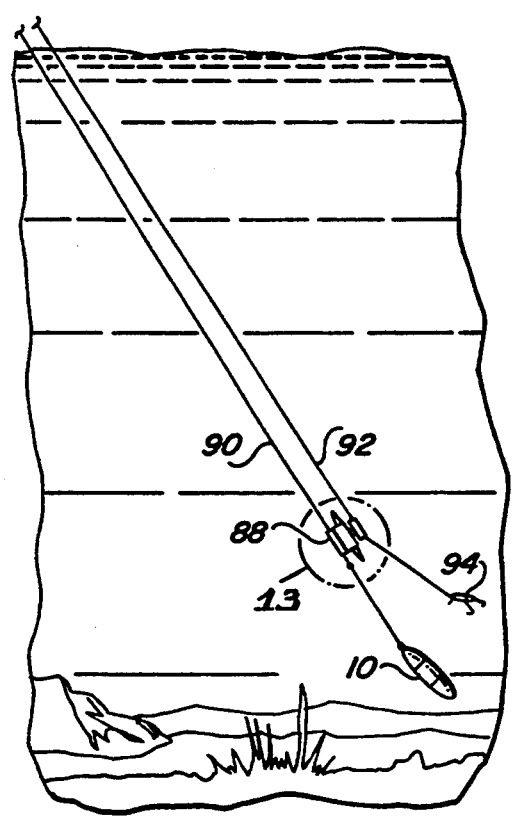
FIG. 12
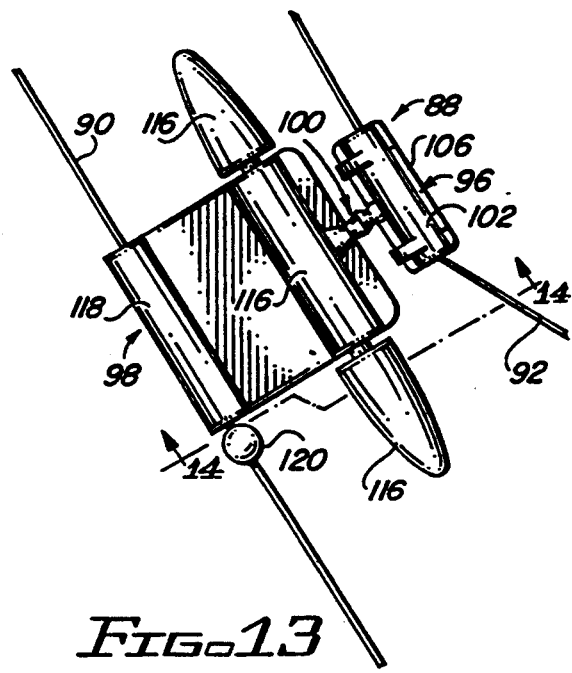
FIG. 13
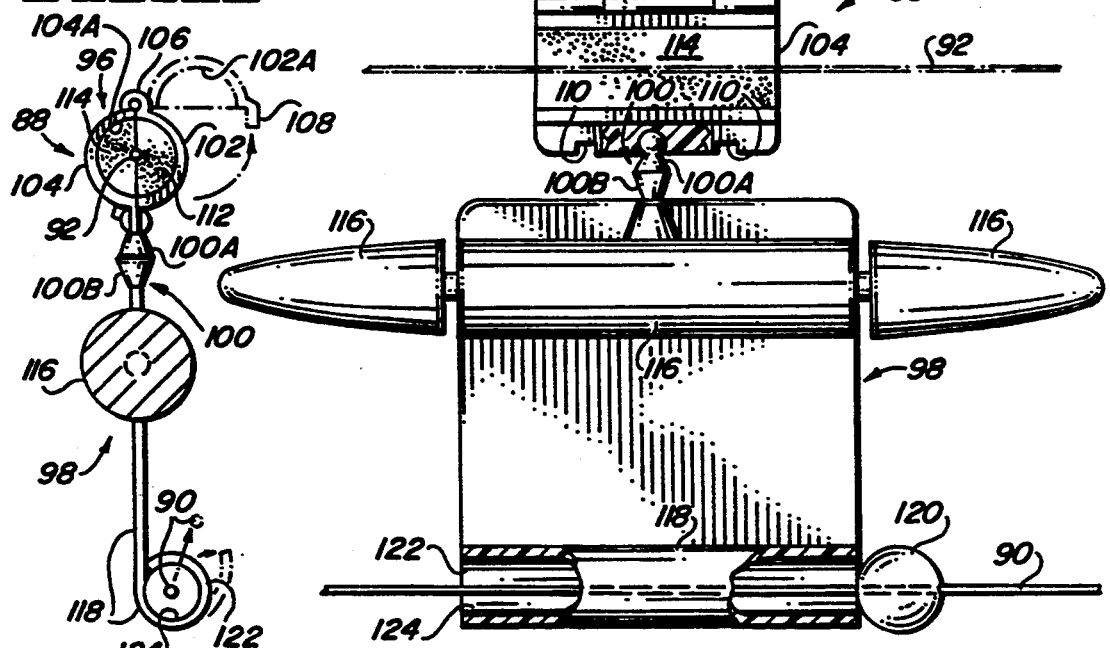
FIG. 14
FIG. 15

DOWNRIGGER LINE RELEASE DEVICE

This application is a divisional of copending patent application Ser. No. 08/147,389 filed Nov. 3, 1993.

BACKGROUND OF THE INVENTION

1. Field of the Invention

The present invention generally relates to fishing accessories and, more particularly, is concerned with a downrigger weight assembly and a line release device.

2. Description of the Prior Art

There are many types of fish lures of different sizes and shapes known in the prior art. They are varied in design to accommodate many conditions of use as well as kinds of bodies of water and types of game fish. They are also varied in density to function at the surface of the body of water or at the bottom thereof or inbetween.

Representative examples of different designs of lures proposed in the prior patent art are disclosed in U.S. Patents to Norton (U.S. Pat. No. 2,624,971), Bettini (U.S. Pat. No. 2,791,058), Ferguson et al (U.S. Pat. No. 2,983,065), Charney (U.S. Pat. No. 3,705,465), and Thom (U.S. Pat. No. 4,257,182).

Norton (U.S. Pat. No. 2,624,971) discloses a fish lure having a float casing of buoyant material. The float casing has a cylindrical opening in its upper end and is closed at its lower end. A series of elongated holes are provided in a peripheral wall of the casing. A cover is provided for the upper open end of the casing. Lure material can be provided in the casing to exude into the surrounding water through the elongated holes.

Bettini (U.S. Pat. No. 2,791,058) discloses a fish attractor having a hollow cylindrical of uniform diameter and a scented material inserted therein. Both ends of the body are interiorly threaded to receive front and rear closure caps. The front cap has a slanted outer leading face to impart erratic movements to the attracter as it is drawn through the water. The caps are formed with central openings and the body has perforations therein for admitting water into the body and discharging and diffusing odors or scents into the water from the material.

Ferguson et al (U.S. Pat. No. 2,983,065) discloses a fishing lure in the form of a two-part hollow plug having a nosepiece and a body portion of lightweight material and secured together by screw threads. The plug can be filled with weights such as lead shot. The ends of the nosepiece and body are axially bored to permit free flow of water through them. Also bores are formed through the nosepiece and body. The plug being hollow can receive a scented or bleeding bait in addition to the lead shot. Various devices can be clamped between shoulders on the nosepiece and body portion. The lure also includes hook mounting members and annular fin-defining rings.

Charhey (U.S. Pat. No. 3,705,465) discloses a fish lure having an elongated plug-like hollow body of light refracting plastic material terminating at one or both ends with an oblique face to provide a circle of emitted light. Exteriorly of the body are ribs. Interiorly of the body is a rollable ball, spinners or a quantity of salmon eggs.

Thom (U.S. Pat. No. 4,257,182) discloses a variable ballast chumming lure which includes a body portion, tail portion, a dorsal fin and hooks. Two spaced bulkheads divide the interior of the body portion into three compartments which contain a fluid (a liquid chum). Perforations in the bulkheads permit controlled movement of the fluid between the compartments.

While the above-described fish lures may perform satisfactorily under the limited range of conditions for which they were designed, none appear to embody the features required to accommodate the many conditions of use, types of water, types of game fish and locations in the body of water. Consequently, a need still exists for a design which incorporates features which more adequately address the requirements and conditions of use.

SUMMARY OF THE INVENTION

The present invention provides a downrigger weight assembly designed to satisfy the aforementioned need. The downrigger weight assembly of the present invention can be placed at any depth in the body of water from the surface to bottom by adding or subtracting ballast for the desired depth. The assembly serves multiple functions by having an elongated casing which includes a front cavity for holding fish attractant, a rear cavity for holding one or more weights to add to or subtract from ballast, and a middle cavity for holding various communication elements, such as light and sound transmitters.

The casing of the assembly of the present invention can be converted between multiple uses by employing different extensions thereon. The assembly can be used as a trolling module attached to a single fishing line in a variety of ways, such as with an elongated tail element as a bottom bouncer or by replacing the tail element with a rear plug element to use it for vertical fishing.

Also, the assembly of the present invention can be used in several different modes, one of which is as a downrigger module with a sonar transducer inserted in the casing where the rear plug element fits. The transducer is operated by means of a wire inside of a fish line attached to the a sonar display module mounted to the rod-reel. Heretofore, the transducer was mounted to the bottom of the boat such that the sonar transducer transmitted from and received at the surface of the body of water. Now the transducer is located at the same depth as the fish and so transmits and receives at such depth.

Another mode of use of the assembly is as a casting module using one line. In this mode of use, the rearward portion of the casing is changed from the rubber tail and plug versions to a V-shaped boat-like end configuration.

The present invention also provides a downrigger line release device which, although not so limited, can be employed with the downrigger weight assembly described above. The downrigger line release device of the present invention includes a first member in the form of a clam-shell type clamp adapted to mount on a fishing line in a stationary position therealong, a second member in the form of a coupler having a base element and a flexible retainer element attached to the base element and being adapted to mount on a downrigger line so as to undergo slidable movement therealong, and a swivel connector interconnecting the clamp and coupler so as to permit relative pivotal movement therebetween. The flexible retainer element is in the form of a band of material being resiliently biased to normally assume a rolled-up condition in which the retainer element defines a sleeve having a passageway for receiving the downrigger line therethrough. The retainer element is convertable to an unrolled condition in response to a predetermined force being applied in a transverse relation to the downrigger line to the coupler via the clamp and connector from the fishing line. In reaching the unrolled condition, the retainer element releases the downrigger line and thereby permits the uncoupling of the fishing line from the downrigger line.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an elevational view of a downrigger weight assembly of the present invention shown attached on a single fishing line and disposed in a bottom trolling mode.

FIG. 2 is a perspective view of a sonar display module mounted on a fishing rod reel connected via a conductor wire inside of a fishing line in communication with a sonar transducer mountable to the casing of the downrigger weight assembly.

FIG. 3 is an enlarged longitudinal sectional view of the assembly of the present invention showing the tandemly arranged cavities in the casing and a plug element mounted to the rear end of the casing.

FIG. 4 is a fragmentary longitudinal sectional view of the casing similar to that of FIG. 3 but showing an elongated tail element mounted to the rear end of the casing.

FIG. 5 is a side elevational view of a bait cartridge and a basket for holding the cartridge which can be employed in the assembly of FIG. 3.

FIG. 6 is a side elevational view of a flotation insert which can be employed in the assembly of FIG. 3.

FIG. 7 is a perspective view of one embodiment of the weighted body employed in the assembly, being in the form of a single segment.

FIG. 8 is a cross-sectional view of the single segment weighted body taken along line 8—8 of FIG. 7.

FIG. 9 is an exploded perspective view of another embodiment of a weighted body employed in the assembly, being in the form of a plurality of weight segments stackable together.

FIG. 10 is a fragmentary longitudinal sectional view of the casing similar to that of FIG. 4 but showing an sonar transducer mounted to the rear end of the casing.

FIG. 11 is an enlarged fragmentary plan view taken along line 11—11 of FIG. 10.

FIG. 12 is an elevational view of a line release device of the present invention shown interconnecting a pair of separate fishing lines which respectively support the downrigger weight assembly and the fish hook.

FIG. 13 is an enlarged side elevational view of the line release device as shown in the circle 13 of FIG. 12.

FIG. 14 is an enlarged end elevational view, partly in section, of the line release device as seen along line 14—14 of FIG. 13.

FIG. 15 is another enlarged side elevational view of the line release device.

DETAILED DESCRIPTION OF THE INVENTION

Referring to the drawings and particularly to FIG. 1, there is illustrated a downrigger weight assembly, generally designated 10, of the present invention. As shown, the assembly 10 is being used in the configuration of a trolling module attached to a main fishing line 12 along with an auxiliary fishing line 14 terminated with a fish hook 16. In the trolling module configuration, the assembly 10 plays the role of a bottom bouncer.

Referring to FIG. 3, the downrigger weight assembly 10 basically includes an elongated casing 18, means 20 for holding a fish attractant material, and a weighted body 22 for providing ballast for the casing 18. The elongated casing 18 includes separate forward and rearward compartments 24, 26 and a separate middle compartment 28 attached at opposite ends to the forward and rearward compartments 24, 26. The forward and rearward compartments 24, 26 respectively have reversely tapered configurations and define hollow conical-shaped front and rear cavities 30, 32. The forward compartment 24 is open at its rear or inner end 24A and closed at its front nose or outer end 24B. The rearward compartment is open at its front or inner end 26A and also open at its rear end 26B. Eyelets 25 are defined on fins 27 attached to and extending from a side of the respective forward and rearward compartments 24, 26.

The middle compartment 28 has a continuous sidewall 28A being cylindrical in configuration and defining a hollow cylindrical-shaped central cavity 34. The cylindrical sidewall 28A is permanently closed at a front end by a front end wall 28B integrally connected to the sidewall 28A and is non-permanently closed at a rear end by a removable rear cap 28C.

The casing 18 of the assembly 10 also includes attaching means, generally designated 36, in the form of a pair of annular grooves 38 defined about the exterior surface of the middle compartment 28 adjacent to the front end wall 28B and rear end cap 28C thereof, and a pair of annular lips 40 defined about the respective interior surfaces of the forward and rearward compartments 24, 26 at the respective inner ends 24A, 26A thereof. The respective annular grooves 38 are complementary in shape to the annular lips 40 to permit mating of the pair of grooves 38 respectively with the pair of lips 40 and thereby fixedly attach the forward and rearward compartments 24, 26 in a snap-fitted, tandem relationship with the middle compartment 28 of the casing 18.

The casing 18 of the assembly 10 also includes sealing means, generally designated 42, in the form of a pair of annular recesses 44 and a pair of annular seals 46. The annular recesses 44 are defined about the exterior surface of the middle compartment 28, spaced inwardly from the opposite front end wall 28B and rear end cap 28C thereof. The annular recesses 44 are defined adjacent to a pair of oppositely facing shoulders 28D, 28E being defined on opposite ends of an enlarged midsection 28F on the cylindrical sidewall 28A of the middle compartment 28. The inner ends 24A, 26A of the forward and rearward compartments 24, 26 abut against the oppositely facing shoulders 28D, 28E of the middle compartment midsection 28F. The annular seals 46 in the form of O-rings seat about and within the annular recesses 44 and sealably engage with the interior surfaces of the forward and rearward compartments at the inner ends 24A, 26A thereof.

Referring to FIG. 5, the fish attractant material holding means 20 of the assembly 10 is disposable in the front hollow cavity 30 of the forward compartment 24 of the casing 18. The holding means 20 preferably includes a conical-shaped cartridge 50 for containing the fish attractant material and a conical-shaped basket 52 for receiving and enclosing the cartridge 50. The basket 52 preferably has a plurality of apertures 54 defined therein. The basket 52 with the cartridge 50 are removably disposable in the front cavity 30 of the forward compartment 24 of the elongated casing 18. The forward compartment 24 in which the fish attractant material holding cartridge 50 and basket 52 are disposed, has at least a pair of inlet and outlet ports or perforations 56, 58 defined therein through which water can enter and exist from the front cavity 30 so that the fish attractant material can be scented by a fish. Alternatively, when the fish attractant holding means is not in use, a conical-shaped flotation insert 60 shown in FIG. 6 can be placed in the front cavity 30 of the forward compartment 24.

The weighted body 22 of the assembly 10 is disposed in the rear hollow cavity 32 of the rearward compartment 26 of the casing 18 for providing the ballast for the casing. The weighted body 22 preferably takes the form of a single weight segment being solid or hollow, as depicted by the dashed line L in FIGS. 3 and 8, in order to vary the weight of the body 22. As seen in FIGS. 7 and 8, the body 22 and rearward compartment 26 can have respective channels 62 and rails 64 defined longitudinally along opposite sides which interfit to slidably mount the body 22 within the rear hollow cavity 32. As an alternative embodiment, the weighted body 22 can be made up of a plurality of weight segments 22A-22D, as shown in FIG. 9, which can be stacked together and placed in the hollow rear cavity 32.

The assembly 10 also includes one or more communication elements capable of communicating light and sound between the assembly 10 and a fisherman at the surface of a body of water and/or fish swimming in the water in the vicinity of the assembly 10. Such elements can include a light transitter 66, a r.f. transmitter 68, a photocell 70, and batteries 72 for operating the same disposed in tandem relationship in the central hollow cavity 34 of the middle compartment 28 of the casing 18. The removable rear end cap 28C is provided to allow access to the hollow cavity 34 of the middle compartment 28 in order to insert or remove any of the communication elements.

Referring to FIGS. 3 and 4, the casing 18 of the assembly 10 can be converted between multiple uses by employing different extensions thereon. The assembly 10 can be used as a bottom bouncer in a trolling module attached to the single main fishing line 12 by mounting an elongated flexible tail element 74 to the rear or outer open end 26B of the rearward compartment 26 of the casing 18. Optionally, the assembly 10 can be adapted for vertical fishing by replacing the tail element 74 with a flexible rear plug element 76. Preferably, the tail and plug elements 74, 76 are fabricated from a suitable flexible sealing material, such as rubber.

Referring to FIGS. 2, 10 and 11, in accordance with the present invention the assembly 10 can further be converted to another use by mounting a sonar transducer 78 to rear or outer open end 26B of the rearward compartment 26 of the casing 18 in place of either the tail element 74 or plug element 76. Also, a sonar dislay module 80 is mounted to a reel 82 on a fishing rod 84 and an insulated conductive wire 86 is provided to extend from the transducer 78 along a channel 81 formed in the top fin 27 of the casing 18 and therefrom through the fishing line 12 to interconnect and provide communication between the sonar transducer 78 and the sonar display module 80. Pairs of rigid and flexible pins 83, 85 are mounted to the fin 27 and extend toward one another across the channel 81. The pins 83, 85 terminate at ends which are spaced apart by a diagonal gap 87. The flexible pin 85 will yieldably bend to permit the wire 86 to be inserted downward between and past the pins 83, 85 and into the channel 81 for installing and retaining the wire 86 therein.

The sonar transducer 78 and display module 80 are conventional per se and so details of their electronics need not be described for gaining a thorough and complete understanding of the invention, the novel features being the mounting of the sonar transducer 78 on the downrigger weight assembly 10 and the mounting of the sonar display module 80 on the fishing rod 84.

Referring to FIGS. 12-15, there is illustrated a downrigger line release device, generally designated 88, of the present invention, which, although not so limited, can be employed with the downrigger weight assembly 10 described above. The assembly 10 is shown mounted to a downrigger line 90 while the line release device 88 is shown coupling the downrigger line 90 with a fishing line 92 which mounts a fishing hook 94.

Basically, the line release device 88 includes a clamp 96, a coupler 98 and a swivel link or connector 100 rotatably or pivotally interconnecting the clamp 96 and coupler 98 to one another. The clamp 96 of the device 88 preferably takes the form of a clam shell having a pair of clamp elements 102, 104 pivotally connected by a hinge 106 to move toward and away from one another. The clamp elements 102, 104 have latching means in the form of respective complementarily-shaped tabs 108 and slots 110 defined thereon which are adapted to frictionally mate with one another so as to latch the clamp elements 102, 104 to one another in a closed position while permitting unlatching thereof to allow the clamp elements 102, 104 to move to an opened position. A pair of inserts 112, 114 fabricated of a compressible resilient material, such as rubber, are disposed in depressions 102A, 104A defined by the clamp elements 102, 104. When the clamp elements 102, 104 are placed in the closed position, the inserts 112, 114 grip onto the fishing line 92 being disposed therebetween to hold the clamp 96 in a stationary position therealong.

The coupler 98 of the device 88 includes a base element 116 and a flexible retainer element 118 attached to and extending from a side of the base element 116. The retainer element 118 is adapted to mount on the downrigger line 90 so as to undergo slidable movement therealong. A ball 120 fixed on the downrigger line 90 limits movement of the device 88 down the line 90 so as to prevent the device 88 from making contact with the downrigger weight assembly 10. The retainer element 118 is in the form of a band of material being resiliently biased to normally assume a rolled-up condition in which the retainer element 118, as shown in solid line form in FIG. 14, defines a sleeve 122 having a passageway 124 for receiving the downrigger line 90 therethrough. The retainer element 118 is convertable to an unrolled condition, as shown in dashed line form in FIG. 14, in response to a predetermined force being applied in a transverse relation to the downrigger line 90 to the coupler 98 via the clamp 96 and connector 100 from the fishing line 92, such as is generated by a fish is caught on the hook 94. Upon reaching the unrolled condition, the retainer element 118 releases from the downrigger line 90 and thereby permits the uncoupling of the fishing line 92 from the downrigger line 90.

The swivel connector 100 of the device 88 which interconnects the clamp 96 and coupler 98 includes a pair of connector elements 100A, 100B. The connector elements 100A, 100B are respectively rigidly attached to the clamp 96 and coupler 98 and rotatably connected to one another so as to permit pivotal or rotatably movement of the clamp 96 and coupler 98 relative to one another.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A downrigger line release device, comprising:
   (a) a first member adapted to mount on a fishing line;
   (b) a second member adapted to mount on a downrigger line so as to undergo slidable movement therealong; and
   (c) a connector interconnecting said first and second members;
   (d) said second member including a flexible retainer element resiliently biased to normally assume a rolled up condition in which said retainer element defines a sleeve having a passageway for receiving the downrigger line therethrough, said retainer element being convertable to an unrolled condition, in response to a predetermined force being applied in a transverse relation to the downrigger line to said second member via said first member and connector from the fishing line, in which the downrigger line is thereby permitted to release from said retainer element of said second member.

2. The device of claim 1 wherein said first member is a clamp in the form of a clam shell having a pair of clamp elements pivotally connected by a hinge to move toward and away from one another.

3. The device of claim 2 wherein said clamp elements have means for latching said clamp elements in a closed position and for unlatching said clamp elements to permit movement thereof to an opened position.

4. The device of claim 3 wherein said latching means includes complementarily-shaped tabs and slots defined on said clamp elements being adapted to frictionally mate and unmate with one another.

5. The device of claim 2 wherein said clamp also includes a pair of inserts of a compressible resilient material being attached to said clamp elements so as to grip onto the fishing line upon latching of said clamp elements in said closed position.

6. The device of claim 1 wherein said second member is a coupler.

7. The device of claim 6 wherein said coupler includes a base element, said retainer element being attached to and extending from said base element.

8. The device of claim 6 wherein said retainer element of said coupler is in the form of a band of material being resiliently biased to normally assume a rolled-up condition in which said retainer element defines a sleeve having a passageway for receiving the downrigger line therethrough.

9. The device of claim 8 wherein said first element is a clamp in the form of a clam shell having a pair of clamp elements pivotally connected by a hinge to move toward and away from one another.

10. The device of claim 9 wherein said connector includes a pair of connector elements, one of said connector elements being attached to one of said clamp elements and the other of said connector elements being attached to said coupler, said connector elements also being rotatably connected to one another so as to permit pivotal movement of said clamp and said coupler relative to one another.

* * * * *